No. 676,727. Patented June 18, 1901.
M. SAN.
MATCH MAKING MACHINE.
(Application filed Oct. 24, 1899. Renewed Oct. 29, 1900.)
(No Model.) 12 Sheets—Sheet 2.

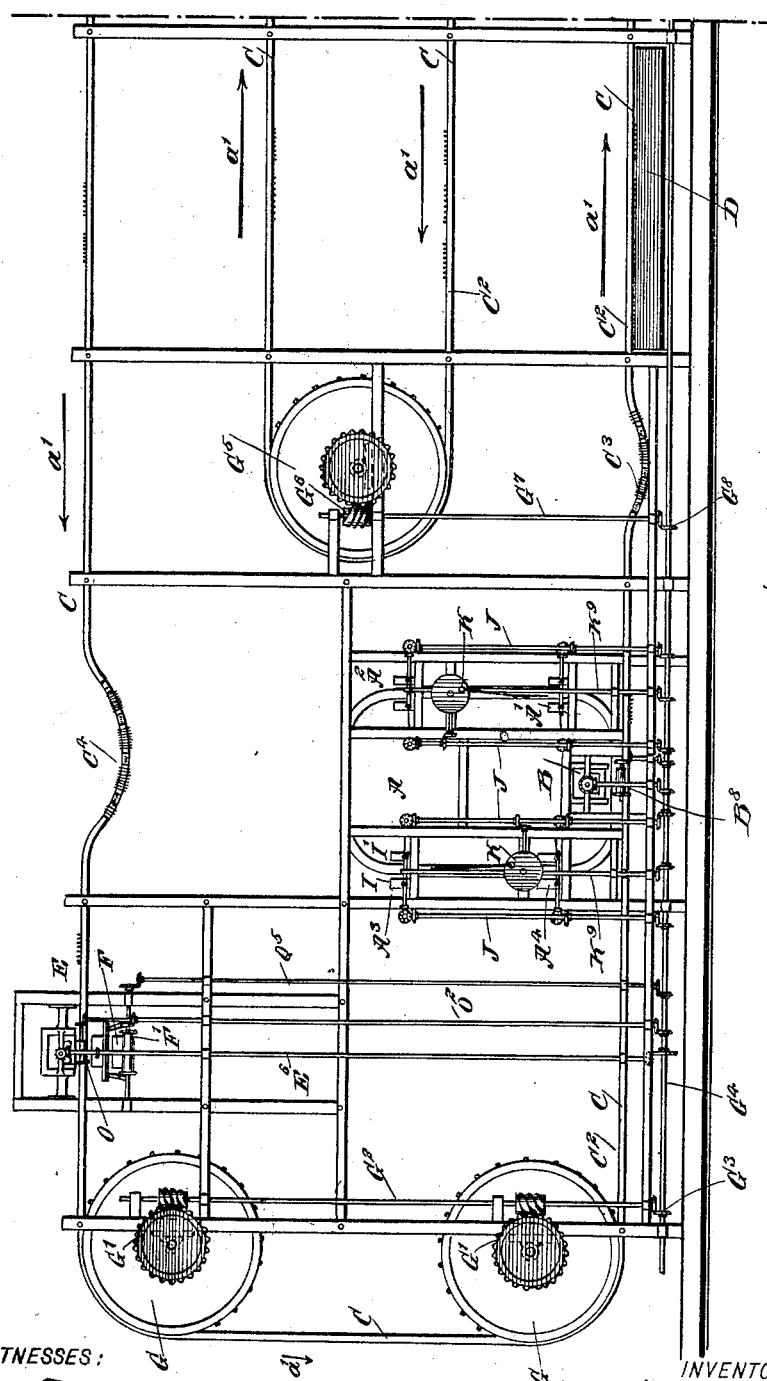

WITNESSES: INVENTOR
ATTORNEYS

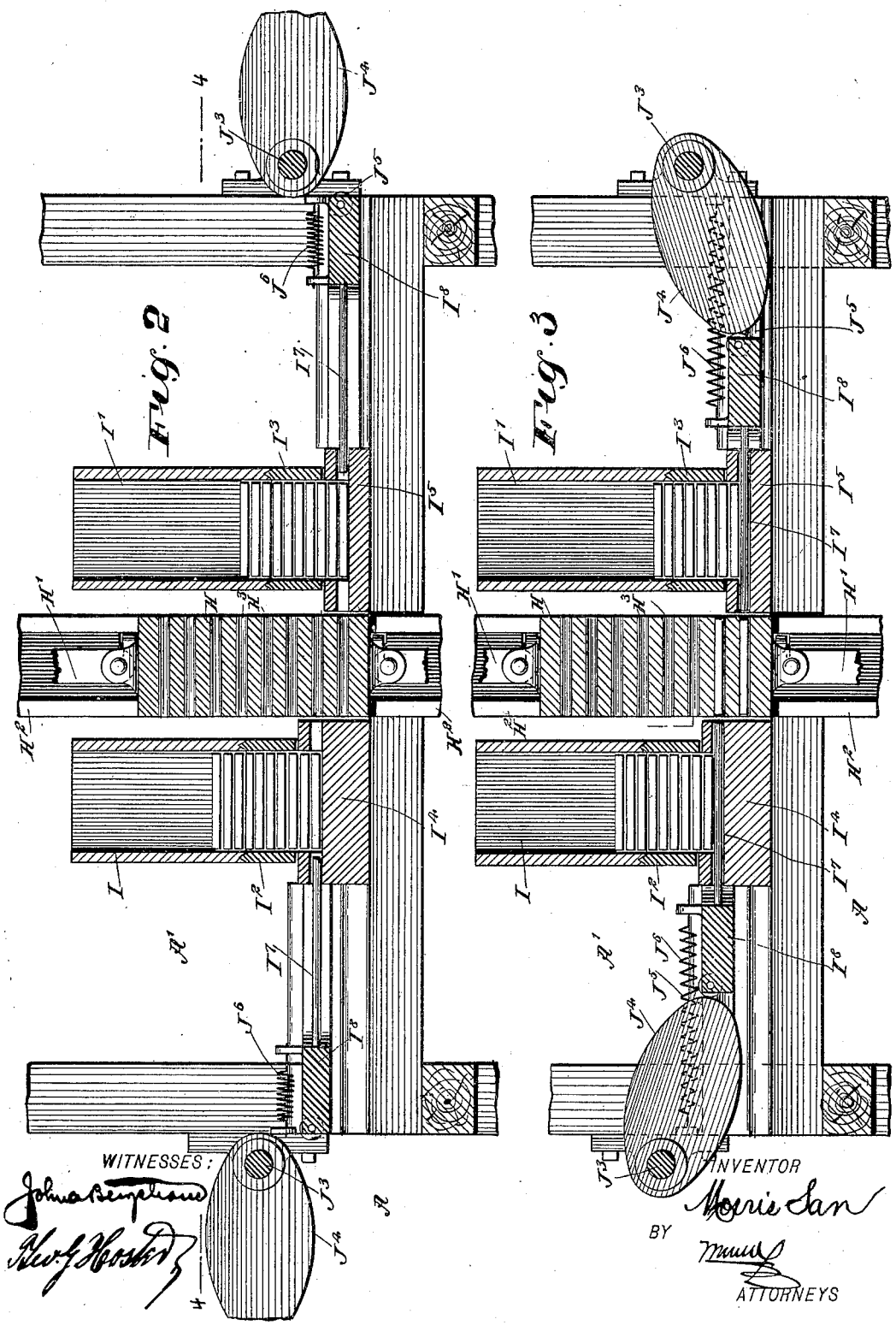

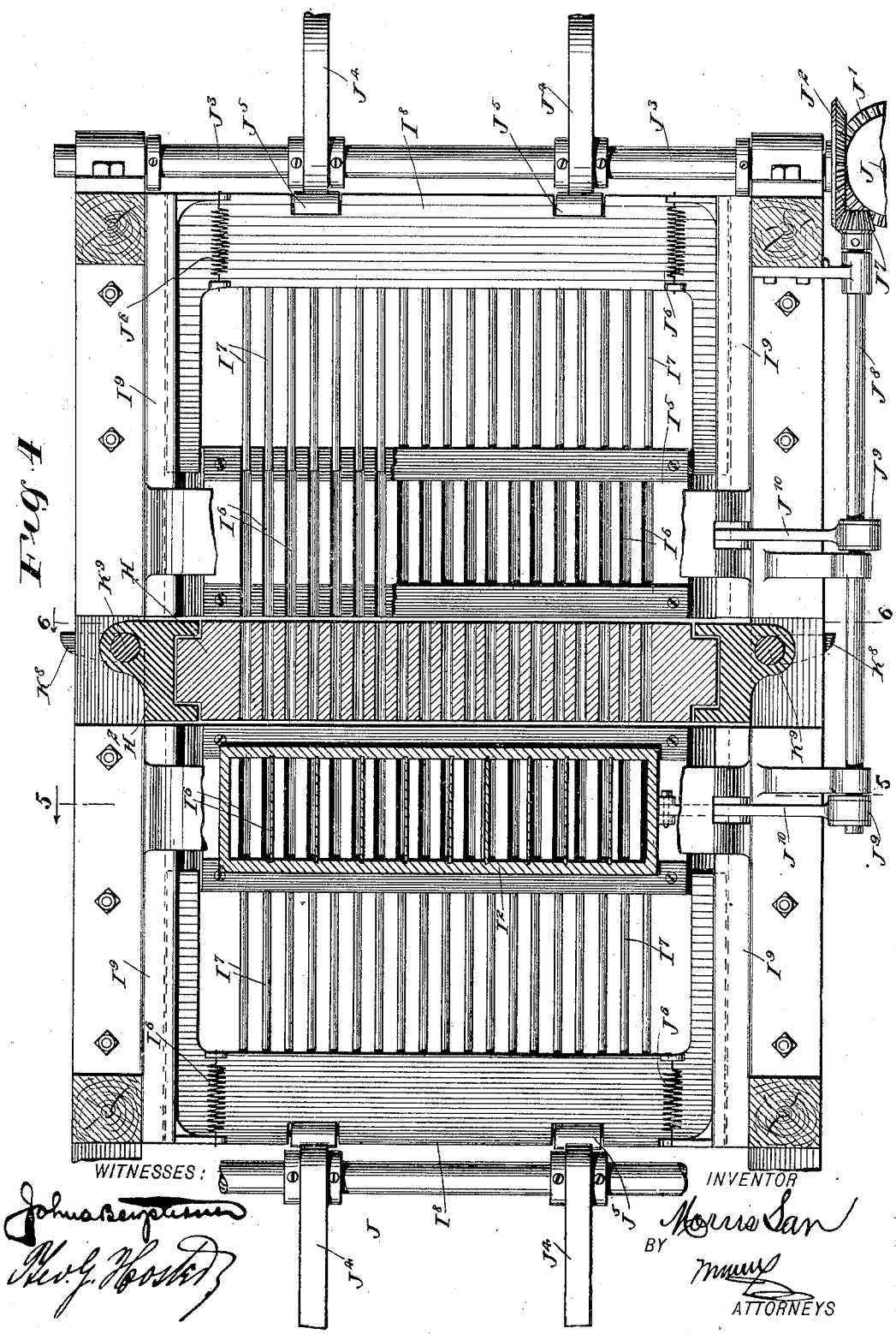

No. 676,727. Patented June 18, 1901.
M. SAN.
MATCH MAKING MACHINE.
(Application filed Oct. 24, 1899. Renewed Oct. 29, 1900.)
(No Model.) 12 Sheets—Sheet 5.
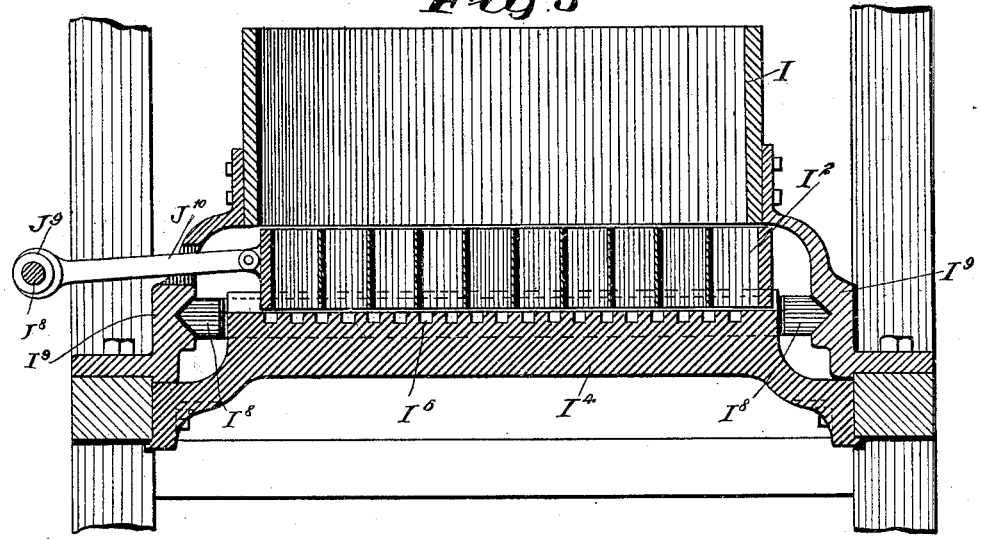
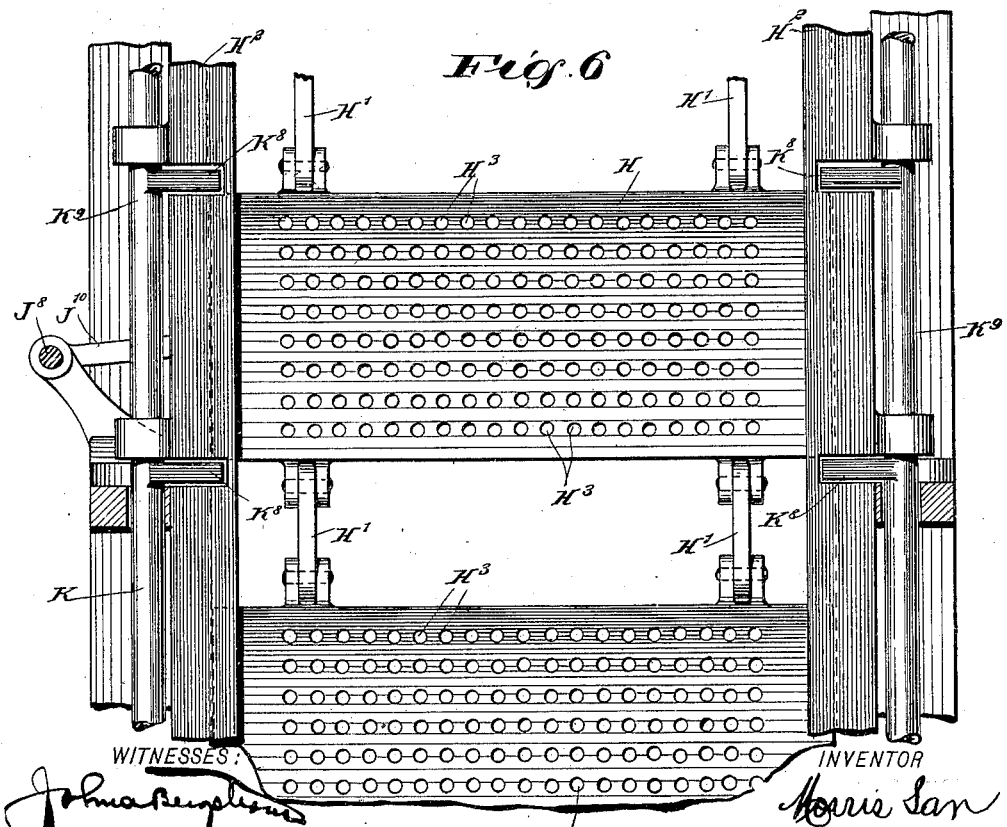

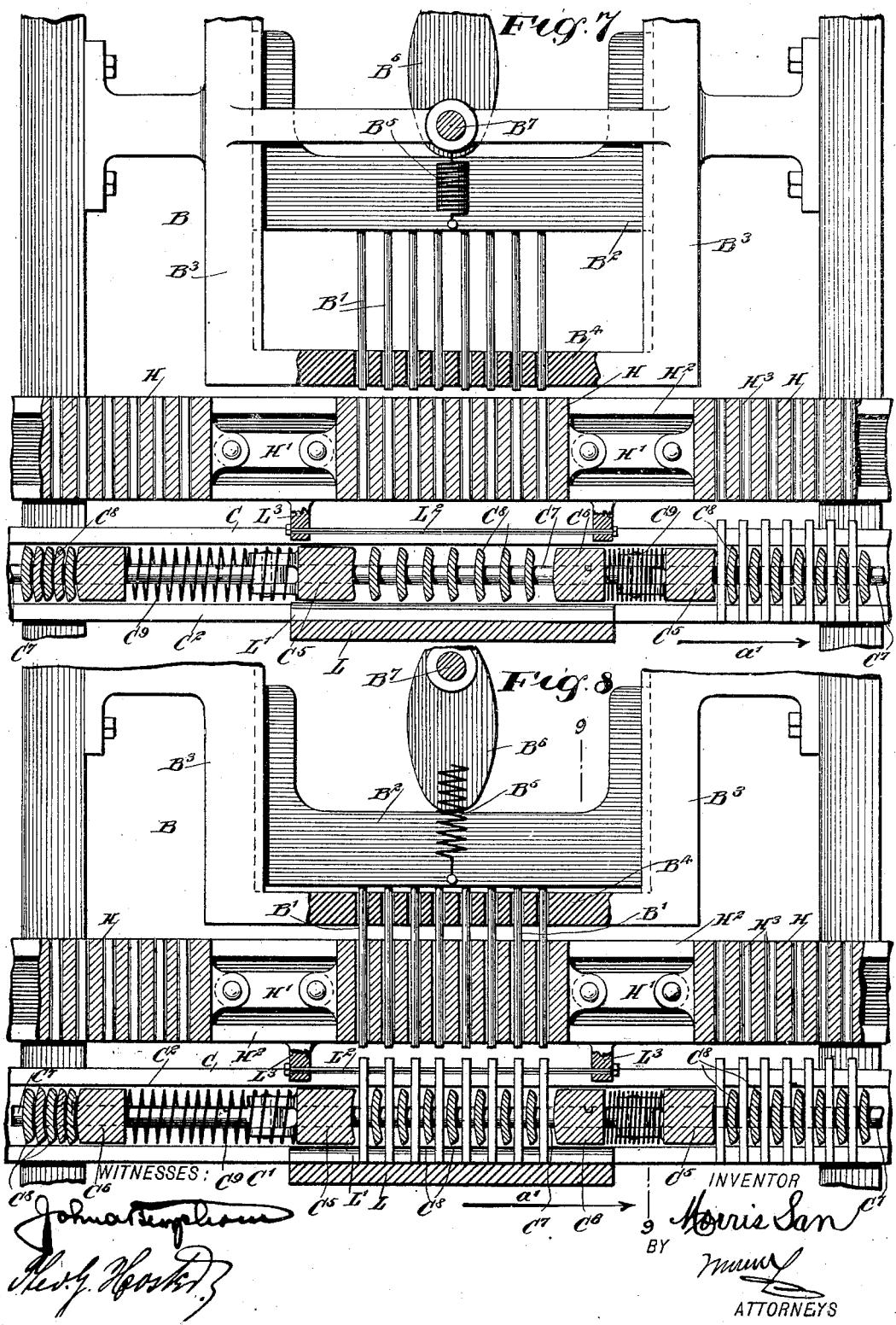

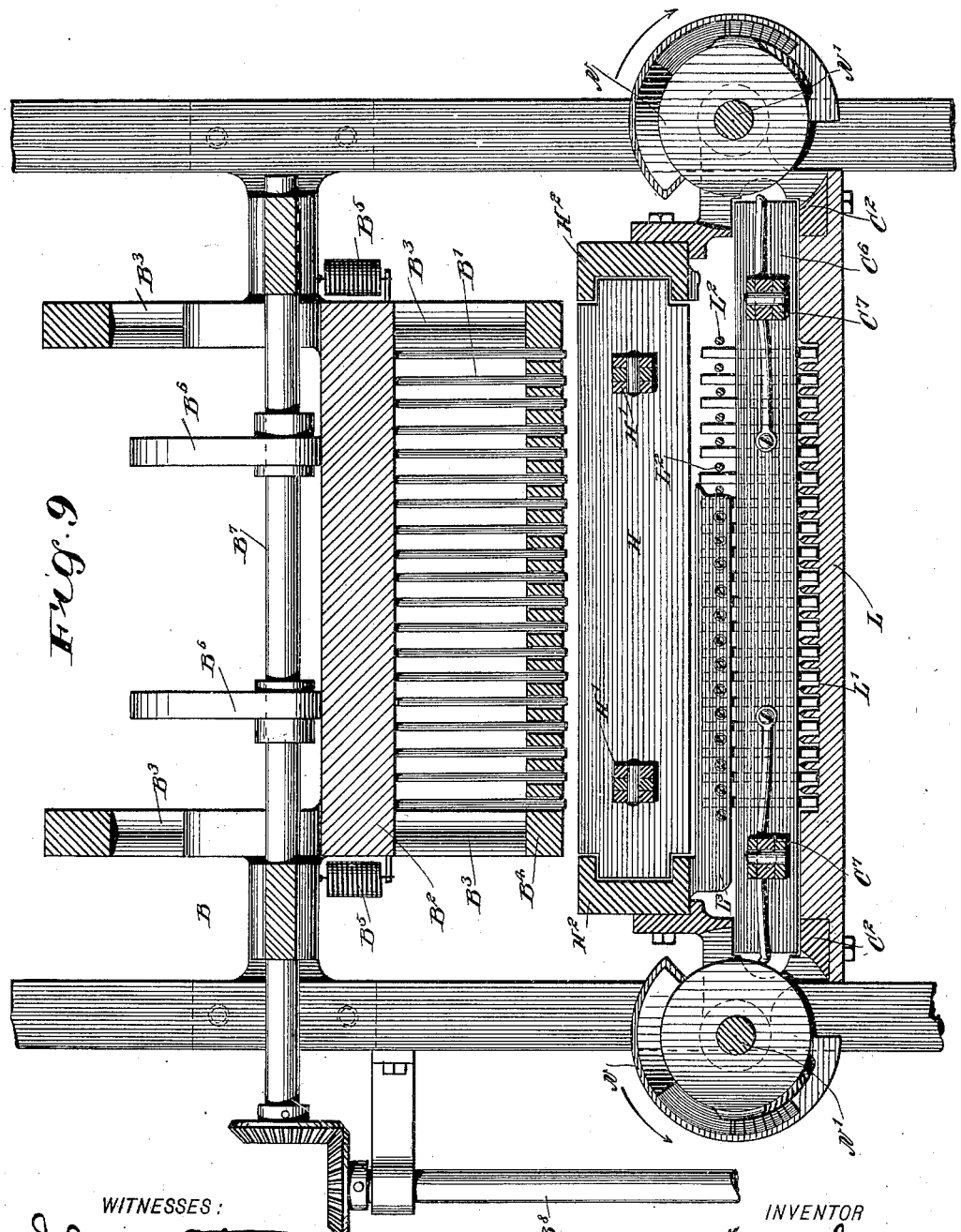

No. 676,727. Patented June 18, 1901.
M. SAN.
MATCH MAKING MACHINE.
(Application filed Oct. 24, 1899. Renewed Oct. 29, 1900.)
(No Model.) 12 Sheets—Sheet 8.
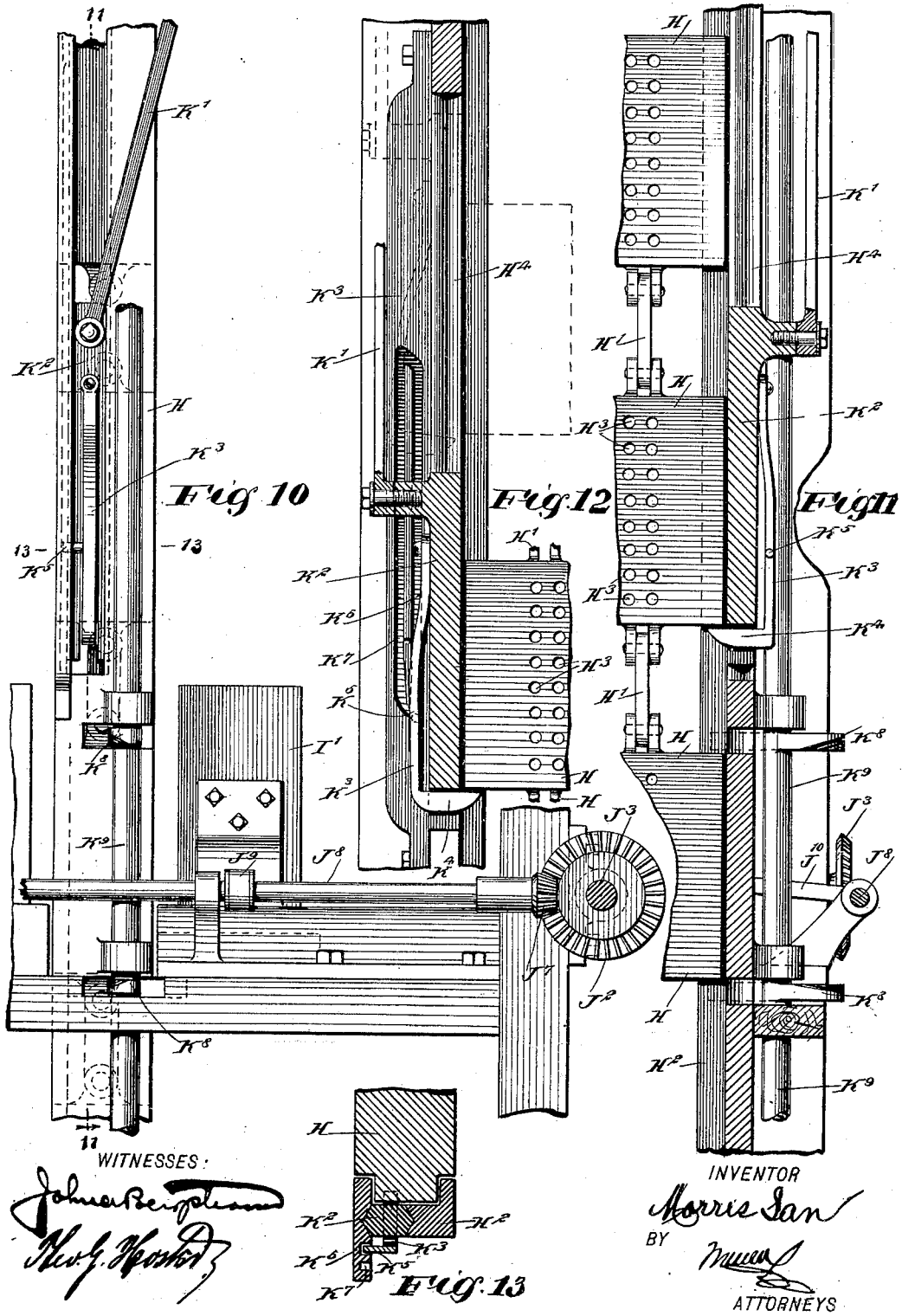
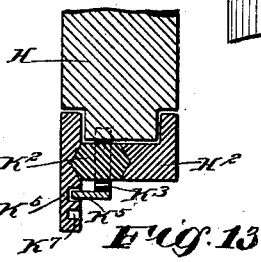
WITNESSES:
INVENTOR
Morris San
BY
ATTORNEYS

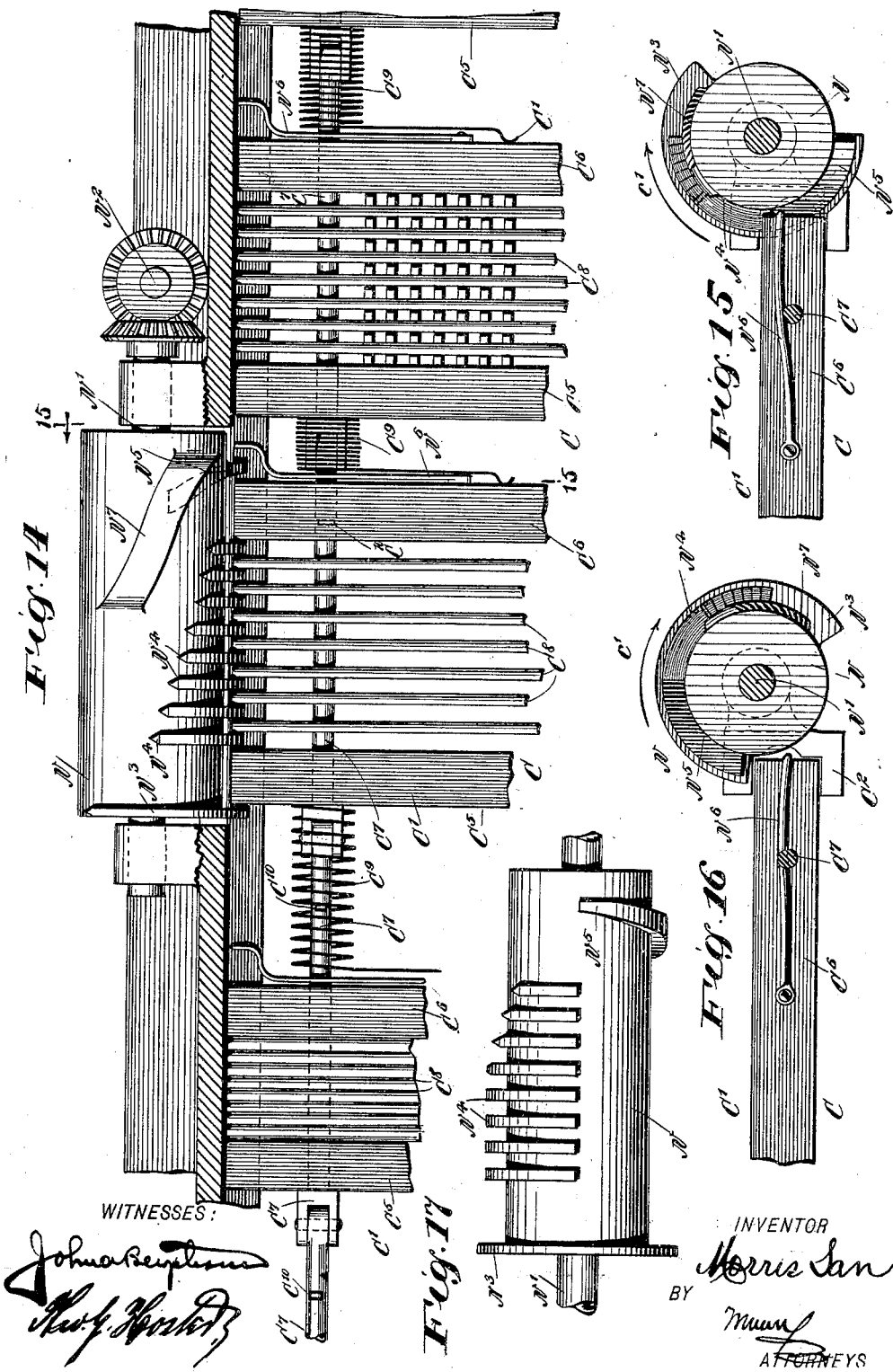

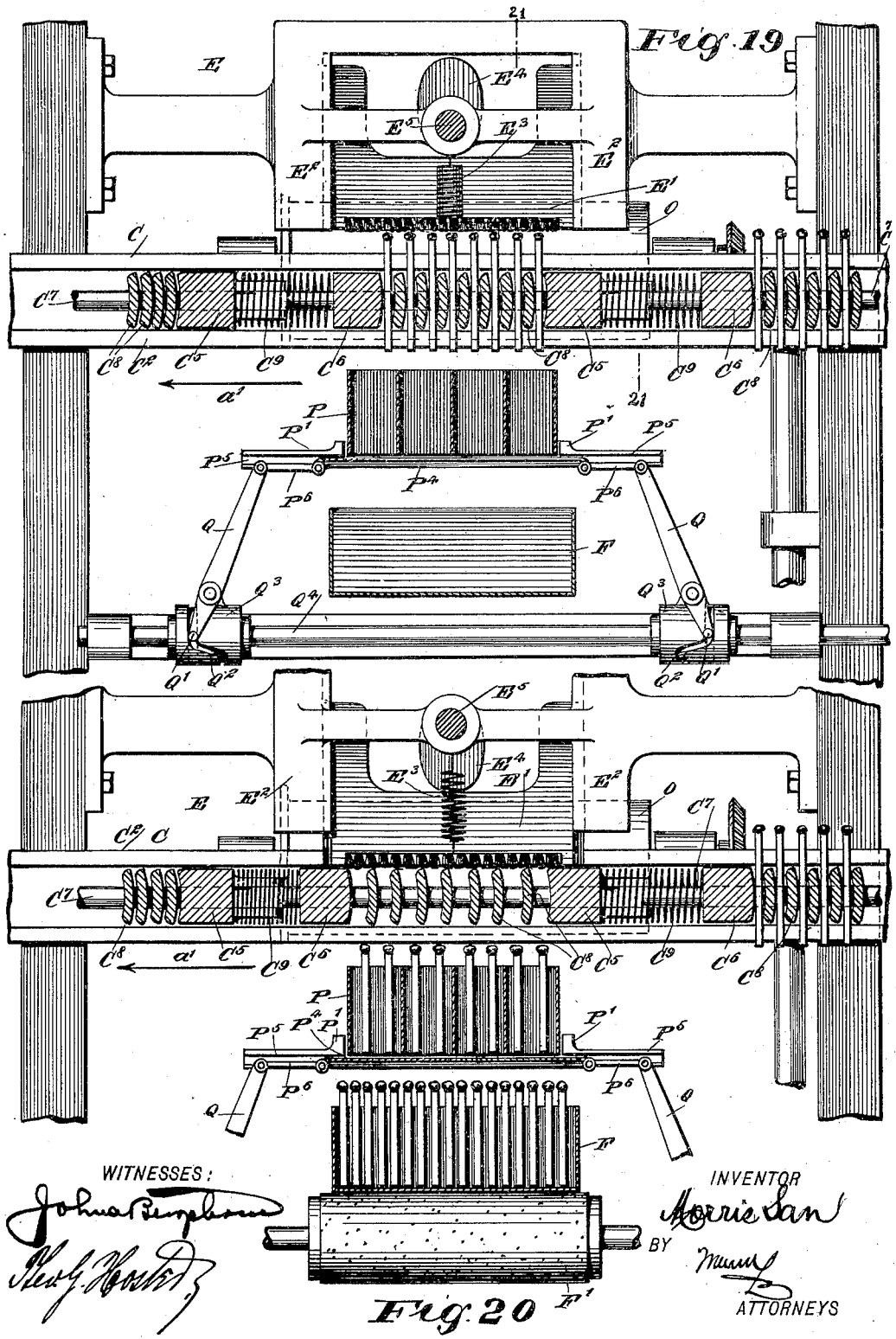

No. 676,727. Patented June 18, 1901.
M. SAN.
MATCH MAKING MACHINE.
(Application filed Oct. 24, 1899. Renewed Oct. 29, 1900.)
(No Model.) 12 Sheets—Sheet 12.
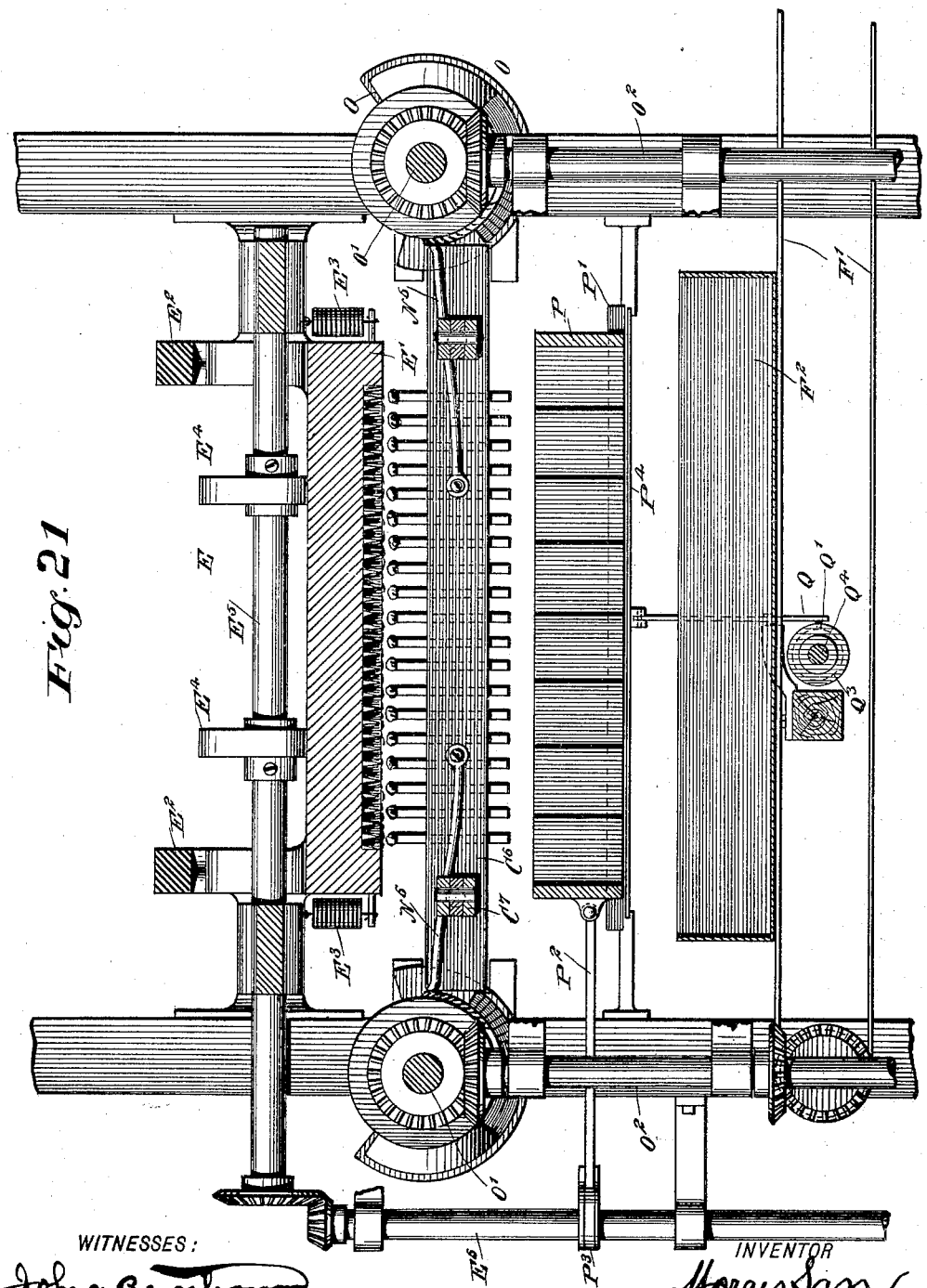

UNITED STATES PATENT OFFICE.

MORRIS SAN, OF PATERSON, NEW JERSEY, ASSIGNOR, BY DIRECT AND MESNE ASSIGNMENTS, TO THE FEDERAL MATCH COMPANY, OF SAME PLACE.

MATCH-MAKING MACHINE.

SPECIFICATION forming part of Letters Patent No. 676,727, dated June 18, 1901.

Application filed October 24, 1899. Renewed October 29, 1900. Serial No. 34,801. (No model.)

*To all whom it may concern:*

Be it known that I, MORRIS SAN, of Paterson, in the county of Passaic and State of New Jersey, have invented a new and Improved Match-Making Machine, of which the following is a full, clear, and exact description.

The object of the invention is to provide a new and improved match-making machine designed to cheapen the cost of making matches and arranged to automatically assemble the splints and deliver the same in very large quantities to an endless carrier, which in turn presents the ends of the splints successively to heat, to a paraffin-bath, and to a header to finally dry and then deliver the finished matches in a convenient manner for packing.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 16:
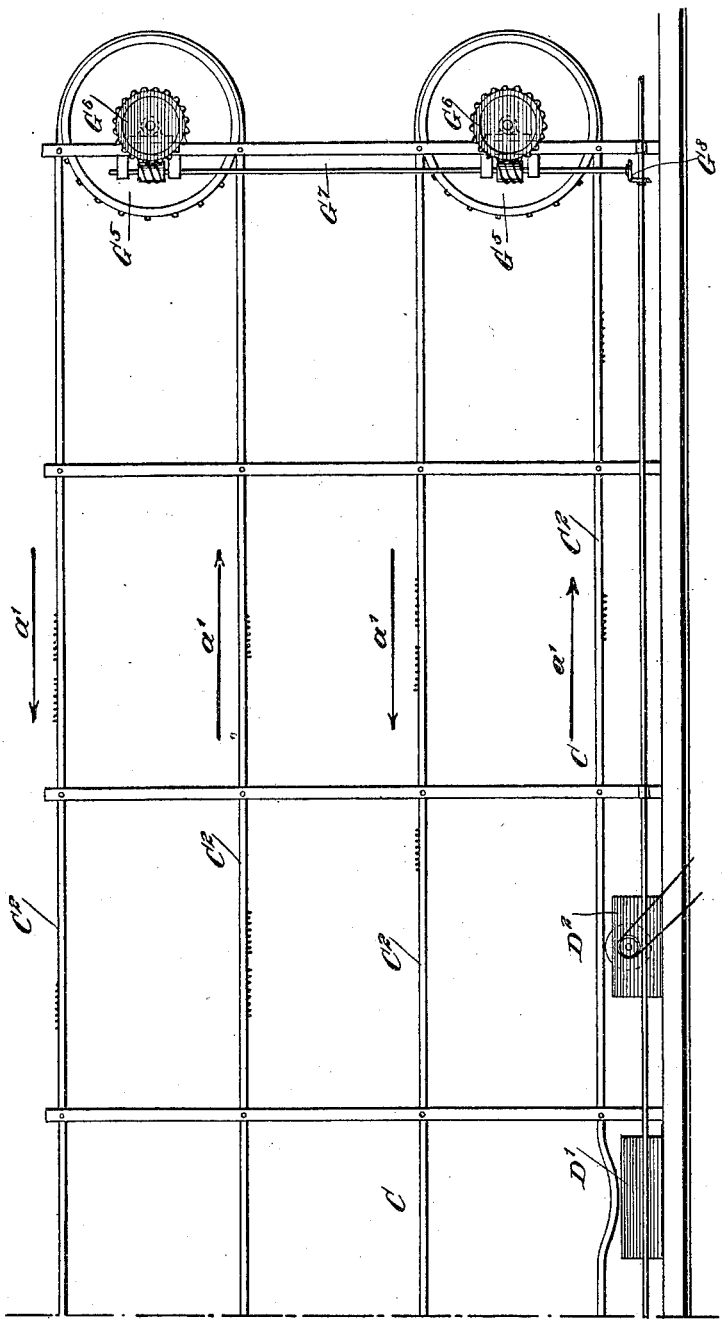
Figure 18:
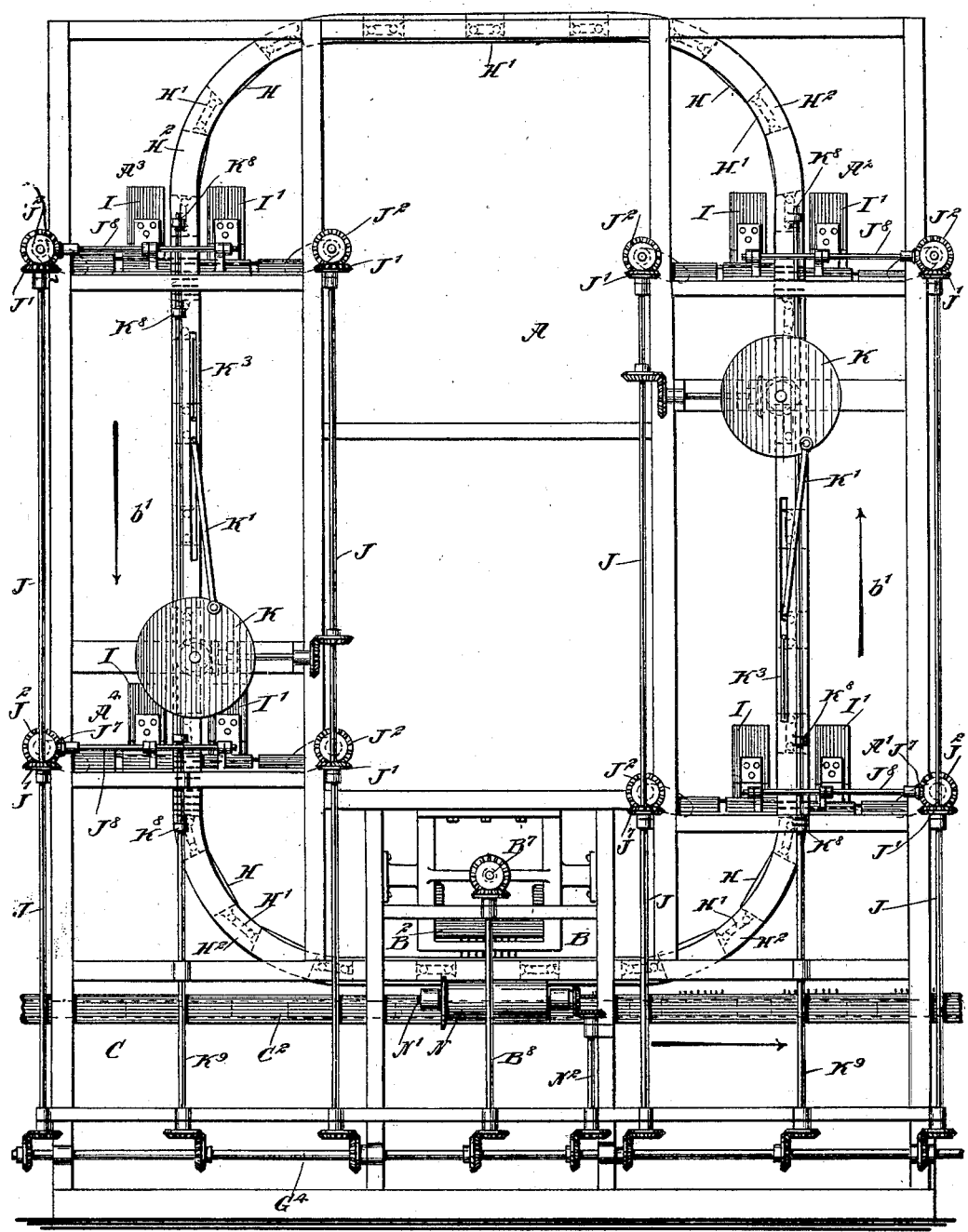

Figure 1ᵃ is a partial side elevation of the improvement. Fig. 1ᵇ is a partial side elevation of the improvement, said figure being a continuation of Fig. 1ᵃ. Fig. 2 is an enlarged sectional side elevation of one of the splint-assembling devices. Fig. 3 is a similar view of the same with parts in a different position. Fig. 4 is a sectional plan view of the same on the line 4 4 in Fig. 2. Fig. 5 is a transverse section of the same on the line 5 5 in Fig. 4. Fig. 6 is a similar view of the same on the line 6 6 in Fig. 4. Fig. 7 is an enlarged sectional side elevation of the transferring device for transferring the assembled splints to the endless carrier and locking them in place therein. Fig. 8 is a like view of the same with parts in a different position. Fig. 9 is a transverse section of the same on the line 9 9 in Fig. 8. Fig. 10 is an enlarged side elevation of part of the mechanism for imparting an intermittent motion to the endless belt of the assembling device. Fig. 11 is a transverse section of the same on the line 11 11 in Fig. 10 looking in the direction of the arrow. Fig. 12 is a like view of the same on the line 11 11 in Fig. 10 looking in a direction opposite to that of said arrow. Fig. 13 is a sectional plan view of the same on the line 13 13 in Fig. 10. Fig. 14 is an enlarged sectional plan view of the locking device for locking the splints in position on the endless carrier. Fig. 15 is a transverse section of the same on the line 15 15 in Fig. 14. Fig. 16 is a similar view of the same with parts in a different position. Fig. 17 is a side elevation of the cam for actuating the splint-locking device. Fig. 18 is an enlarged side elevation of the entire splint-assembling device and the transferring device for transferring the assembled splints to the endless carrier. Fig. 19 is an enlarged sectional side elevation of the match releasing, discharging, and collecting device. Fig. 20 is a similar view of the same with parts in a different position, and Fig. 21 is a transverse section of the same on the line 21 21 in Fig. 19.

In the improved match-making machine use is made of a splint-assembling device A, in which a plurality of stations are made use of to assemble a large quantity of splints and to transfer the same to an endless traveling conveyer, from which the assembled splints are transferred by a transferring device B to an endless carrier C, traveling in the direction of the arrows a', to bring the lower ends of the splints successively to a heater D for heating the splints, then to a paraffin-pan D' for coating the ends of the splints with paraffin, then to a header D² for providing the splints with heads of an igniting composition, the carrier then moving the matches thus formed through the air to insure a perfect drying, and finally carrying the finished matches to a releasing, discharging, and collecting device E to release the matches from the carrier, to collect the same, and finally discharge the matches into a box F on an endless belt F' (see Figs. 1ᵃ, 19, 20, and 21) to carry the box filled with matches to the packer. The carrier C has a continuous traveling motion from the heater D to within a short distance of the releasing, discharging, and collecting device E and an intermittent traveling motion between the latter device E and the transferring device B and the splint-assembling device A. For this purpose the carrier is formed with link-frames C', pivotally connected with each other and mounted to travel in suitable guideways C², carried by the framework of the machine, said guideways being interrupted at the points C³ C⁴ to allow the link-frames to hang down loosely and permit the portion of the carrier at the right of the points C³ C⁴ to travel continuously and the other portion at the left of said points to travel intermittently. The intermittently-driven portion of the carrier passes over intermittently-driven sprocket-wheels G, connected by worm and worm-wheel gears G' to a vertically-disposed shaft G², connected by a mutilated gear G³ with the main driving-shaft G⁴, extending horizontally and connected with suitable machinery for imparting a continuous rotary motion to said shaft G⁴. The continuous traveling portion of the carrier C passes over sprocket-wheels G⁵, connected by worm and worm-gears G⁶ to vertical shafts G⁷, connected by gears G⁸ with the main driving-shaft G⁴, so that when the latter is rotated a continuous rotary motion is given to the sprocket-wheels G⁵ and an intermittent rotary motion to the sprocket-wheels G, for the purpose above mentioned.

The assembling device A is provided with a plurality of stations—for instance, as shown in Figs. 1ª and 18, four stations A' A² A³ A⁴; but the number may be increased to still more increase the capacity of the machine. The stations are all alike in construction, and at each station the splints derived from a suitable source are assembled and transferred to a conveyer in the form of a perforated link block or holder H, forming one of the links in an intermittently-traveling endless chain, each station contributing its quota to a block H, so that when the latter has passed the several stations it has received a set of spaced splints from each station and is thus filled with a large quantity of spaced splints, which are now transferred by the transferring device B to a link C' of the carrier C in this spaced condition and locked in this condition at the middle of the splints, so that the upper and lower ends of the splints project above and below the carrier.

As shown in detail in Figs. 2, 3, 4, 5, and 6, the blocks H are connected with each other by links H', and the blocks are mounted to travel at their ends in suitable guideways H², carried by the framework of the assembling device A, and each block is formed with eight rows of apertures H³, of which two rows are filled at a time at a single station, so that when the block has passed the four stations all the apertures H³ are filled with splints. Thus at the station A' the two lower rows in a block are filled with splints, at the station A² then the next two rows, and so on. As the construction of the stations is alike, it suffices to describe the station A' in detail, special reference being had to Figs. 2, 3, 4, 5, 6, and 18.

On opposite sides of the chain carrying the link-blocks H are located two hoppers I I', each of which receives the splints from a suitable source, and under said hoppers reciprocate transverse shaking-boxes I² I³, respectively, for readily distributing the splints into the longitudinal recesses formed on the top of the stationary blocks I⁴ I⁵ and into which recesses lead apertures engaged by plungers I⁷, one for each aperture and recess, to push the splint out of the recess and aperture into the corresponding aperture H³ in the block H registering at the time with the apertures in the blocks I⁴ I⁵. Thus, as shown in Figs. 2 and 3, the splints in the block I⁵ are pushed by the plungers I⁷ into the lowermost row of apertures H³ in the block H, while the splints assembled in the block I⁴ are pushed by their plungers I⁷ into the second row of apertures H³, as shown in Fig. 3. Now in order to impart a reciprocating motion to the plungers I⁷ and the partition-box I³ the following device is provided: Two vertically-disposed shafts J, geared at their lower ends with the main driving-shaft G⁴, (see Fig. 18,) are provided at each station with bevel gear-wheel, J' in mesh with bevel gear-wheels J², secured on transverse shafts J³, journaled in suitable bearings on the framework of the assembling device A. On the shafts J³ are secured cams J⁴, engaging friction-rollers J⁵ on plunger-frames I⁸, carrying the plungers I⁷ and mounted to slide in suitable bearings I⁹, carried by the framework. Springs J⁶ engage the frames I⁸ to hold the latter normally in an outermost position and against the cams J⁴, so that the splints can pass into the recesses in the blocks I⁴ I⁵. (See Figs. 2 and 4.) When the shafts J³ are rotated, the cams J⁴ impart an inward sliding motion to the frames I⁸, so that the plungers I⁷ push the splints from the blocks I⁴ I⁵ into the link-block H, as above described, and when the cams J⁴ swing outward the springs J⁶ return the frames I⁸ to an outermost position, so that a new set of splints are passed into the recesses in the blocks I⁴ I⁵. In order to impart a reciprocating motion to the shaking-box I³, the gear-wheel J² is in mesh with a pinion J⁷ on a shaft J⁸, extending longitudinally and journaled in suitable bearings carried by the framework, and on this shaft J⁸ are held eccentrics J⁹, connected by their eccentric-rods J¹⁰ with the boxes I² I³, so that the latter are reciprocated in a transverse direction to cause the splints to be readily distributed into the recesses of the blocks I⁴ I⁵.

In order to impart an intermittent traveling motion to the chain formed of the link-blocks H and the links H', the following device is provided, special reference being had to Figs. 10, 11, 12, 13, and 18: Between the two stations A' A² and between the stations A³ A⁴ are arranged crank-disks K, each of which is connected by a pitman K' with a cross-head K², mounted to slide vertically in suitable bearings H⁴, carried by the guideways $H^2$ for the said chain. On the cross-head $H^2$ is secured a spring-arm $K^3$, formed at its lower end with a foot or lug $K^4$, adapted to pass inward under the bottom of the block $H$ at the time the cross-head $K^2$ is in a lowermost position and shortly after the splints have been passed by the corresponding plungers into the rows of apertures $H^3$ in the block $H$. When the cross-head $K^2$ is moved upward, then the foot $K^4$ pulls on the block $H$ to move the same upward, and thereby imparts a traveling motion to the entire chain, so that the next following block $H$ is brought into proper position relatively to the assembling device at the corresponding station for filling the block with splints, as above described. On each arm $K^3$ is arranged a pin $K^5$, adapted to travel during the upward movement of the cross-head $K^2$ in a slot $K^6$ and during the downward movement passes and travels in a slot $K^7$, arranged alongside the slot $K^6$, and connects with the same at the upper and lower ends, as is plainly indicated in Fig. 12. (Also see Fig. 13.) During the upward traveling motion the pin $K^5$ travels in the slot $K^6$ and holds the foot $K^4$ in an innermost position, and when the cross-head $K^2$ is at the end of its upward movement then the pin $K^5$ passes into the end of the other slot $K^7$ by the resiliency of the spring-arm moving the latter outward and the foot $K^4$ from under the block $H$. During the downward movement of the cross-head $K^2$ the foot $K^4$ remains in an outermost position, so as to pass the next following block at the end and to again engage the bottom of this second block at the time the cross-head moves into a lowermost position and the pin $K^5$ travels from the lower end of the slot $K^7$ into the lower end of the slot $K^6$. During the downward stroke of the cross-head $K^2$ the block now in position in a station is securely locked in place against accidental movement by the arms $K^8$, held spaced on a vertically-disposed shaft $K^9$, geared with the main driving-shaft $G^4$, as shown in Fig. 18, and the said arms $K^8$ during the downward movement of the cross-head $K^2$ are over the top and bottom of the block $H$, thus locking the block in position, and said arms move out of engagement with said block during the upward movement of the cross-head to allow the block to move. It is understood that when the arms $K^8$ engage a block, as described, the block is held against accidental up or down movement and also in such a position that the corresponding rows of apertures $H^3$ are in perfect register with the recesses $I^6$ in the blocks $I^4$ $I^5$, it being understood that said recesses in the blocks $I^4$ $I^5$ are at different levels, as shown in Figs. 2 and 3, for filling two rows of apertures at one time with a corresponding number of splints.

As shown in Figs. 1$^a$ and 18, the guideway $H^2$ for the block-chain is of an approximately rectangular shape with rounded corners, and when a filled block $H$ after leaving the station $A^4$ finally travels into the straight portion of said guideway then it passes directly over the carrier $C$, and when a block $H$ is finally under the transferring device $B$ and directly over the link-frame $C'$, as shown in Figs. 7 and 8, and both the now registering block and link-frame are at a standstill then the splints in the block are transferred from the block to the link-frame by the transferring device $B$. The latter is for this purpose constructed in detail with plungers $B'$ disposed vertically and corresponding with the apertures in the block $H$ and registering with the same at the time being, so that when the plungers $B'$ are moved downward they engage the upper ends of the splints and push the same downward out of their apertures $H^3$ into the now open link-frame $C$, as will be readily understood by reference to Fig. 8. The plungers $B'$ are held in a reciprocating frame $B^2$, mounted to slide in suitable guideways $B^3$, forming part of the framework of the transferring device and secured to the general framework of the machine. The plungers $B'$ are guided in an apertured bar $B^4$, connecting the guideways $B^3$ with each other, and the frame $B^2$ is normally held in an uppermost position, as shown in Fig. 7, by a spring $B^5$ and is forced downward to displace the splints by a cam $B^6$, secured on a shaft $B^7$, journaled in suitable bearings and connected by gearing with a shaft $B^8$, geared to the main driving-shaft $G^4$, as is plainly shown in Figs. 1$^a$ and 18. Thus when the machine is running the rotary motion of the shaft $G^4$ is transmitted to the shaft $B^8$, which in turn rotates the cam $B^6$ to impart a downward sliding motion to the frame $B^2$ and the plungers $B'$ at the time the block $H$ and the link-frame $C'$ are in register with each other and at a standstill, and when the cam $B^6$ swings upward after the splints are discharged from the block $H$ then the spring $B^5$ draws the frame $B^2$ and the plungers $B'$ back into an uppermost position, as shown in Figs. 7 and 8. When this has taken place, the block-chain receives motion to move the now empty block $H$ from under the transferring device and to bring the next following filled block again in position under the transferring device and over an empty link-frame to repeat the above-described operation, it being understood that the block-chain travels in the direction of the arrow $b'$.

Each link-frame $C'$ consists of a plurality of transverse bars $C^5$ $C^6$, of which the bar $C^5$ supports two longitudinally-extending rods $C^7$, of which each rod of a frame is pivotally connected with the corresponding rod of the next following frame, as indicated in Figs. 7, 8, 9, and 14. The bar $C^6$ is mounted to slide on the rod $C^7$ of its link-frame, and between the bars $C^5$ $C^6$ are arranged transversely-extending clamping-plates $C^8$, preferably curved in cross-section, as plainly shown in the drawings, and mounted to slide loosely on the rod $C^7$, the same as the bar $C^6$. The plates $C^8$ and the bar $C^6$ are held in a closed position after leaving the discharge device E by means of springs $C^9$, coiled on the rod $C^7$ and resting with one end against the bar $C^5$ of the adjacent frame, the other end bearing on the bar $C^6$ of the frame in question. The link-frame $C'$ when in a closed position, as described and shown at the left in Figs. 7, 8, and 14, moves during the movement of the carrier C under the filled block H now under the device B, and when in this position the link-frame is opened, so that the splints discharged from the block H by the device B are received and finally locked in position in the frame between the plates $C^8$ and the bars $C^5 C^6$. Under the link-frame $C'$, in position below the device B, is arranged a supporting-plate L, having longitudinally-extending grooves or recesses $L'$ registering with the longitudinal rows of apertures $H^3$ in the link-block H, and above this frame $C'$ and plate L are arranged longitudinally-extending rods $L^2$, secured at their ends to lugs $L^3$, attached to the guideway $H^2$ for the block-chain, as is plainly illustrated in Figs. 7 and 8. The supporting-plate L, the rods $L^2$, and the transverse plates $C^8$, together with the bars $C^5 C^6$, form a retaining-frame for holding the discharged splints in position separate from each other, with the lower and upper ends below and above the link-frame $C'$, as will be readily understood by reference to Fig. 8.

In order to open the link-frame $C'$ to bring the plates $C^8$ and the bars $C^5 C^6$ in the desired position for receiving the splints, an opening device is provided, having cylindrical cams N, secured on shafts $N'$, journaled in suitable bearings on the framework and located at the front and rear ends of the carrier. The shaft $N'$ is geared to a vertical shaft $N^2$, connected by gearing with the main driving-shaft $G^4$, so that the rotary motion of the latter is transmitted to the shaft $N^2$ and by the latter to the shaft $N'$ and the cam N to rotate the latter in the direction of the arrow $c'$. (See Figs. 15 and 16.) Each cam N is formed at its left end with a segmental flange $N^3$ and with a series of spaced ridges $N^4$, having their base ends extending in alinement longitudinally of the periphery of the cam, the ridges diminishing in size from the left to the right to appear in step form on the cam, as is plainly indicated in Fig. 14. When the link-frame $C'$ moves in position for receiving the splints and when in a closed position, then the transverse bar $C^5$ extends between the flange $N^3$ and the next ridge $N^4$, and when the cam N is now rotated the next ridge $N^4$ passes with its pointed end between the bar $C^5$ and the next adjacent plate $C^8$, so as to move this plate away from the bar $C^5$. The next ridge $N^4$ now takes hold of the second plate $C^8$ and moves it away from the first plate, and this operation is successively repeated by the several ridges $N^4$ on the plate $C^8$ until all the plates are moved apart from one another and the bar $C^6$ finally moved away the desired distance from the plate $C^8$, as indicated in Fig. 6. As the ridges $N^4$ are placed an equal distance apart and are of the same width, it is evident that the spaces between the plates $C^8$ and between the end plates and the bars $C^5 C^6$ are alike and sufficiently wide to receive the splints when the latter are forced downward by the plungers $B'$ and out of the block H. When this has taken place, the base ends of the ridges $N^4$ have left the plates $C^8$, and now a returning ridge $N^5$ on the cam N engages the bar $C^6$ to move the latter to the left in the inverse direction of the arrow $a'$ and push the members of the link-frame toward each other to clamp the splints in place in the frame, the plates $C^8$ and the bars $C^5 C^6$ engaging the splints at their middle portions, so that the lower and upper ends project below and above the frame $C'$. In order to lock the several parts of the frame in this clamping position, a lever $N^6$ is provided, pivoted on the outer side of the bar $C^6$ and adapted to drop into a notch $C^{10}$ on the corresponding rod $C^7$ to lock the bar $C^6$ against movement to the right. The lever $N^6$ is held from dropping into the notch $C^{10}$ at the time the frame is opened by a ridge $N^7$, arranged spirally on the cam N and adapted to engage the free end of the lever $N^6$, so as to move the same upward and hold said lever in this uppermost position during the time the lever moves to the right, with the bar $C^6$ above the notch $C^{10}$. When, however, the bar $C^6$ moves into this open position, the lever $N^6$ swings downward and rests on the top of the rod $C^7$ and then moves to the left with the bar $C^6$ when the cam $N^5$ moves the bar in this direction until the lever drops into the notch $C^{10}$ and is thereby locked in position and with it the bar $C^6$. The flange $N^3$ and the ridges $N^4$, $N^5$, and $N^7$ are out of engagement with the frame, and the latter is now moved to the right away from the cams N, and the next following frame is moved in position and after it comes to rest is then opened up by the action of the cams in the manner above described. It is understood that when the bar $C^6$ is moved to the right on the rod $C^7$ the springs $C^9$ are compressed; but it is expressly understood that the springs are not relied upon to hold the members of the frame in a closed clamping position. The splints now locked in a frame $C'$ are intermittently carried to the right by the carrier C, and the projecting ends of the splints are finally moved through the heater D to heat the ends and then through the paraffin-bath in the pan $D'$ to supply the heated ends with paraffin, and then the lower ends of the splints are provided with the igniting-heads at the device $D^2$, it being understood that the heater D, the paraffin-pan $D'$, and the device $D^2$ are of the usual construction, so that further detail description of the same is not deemed necessary. The matches now produced are still carried by the carrier C and moved with it for some time through the air to insure a thorough drying of the matches, the latter finally arriving at the releasing, collecting, and discharging device E, presently to be described in detail.

When the link-frame C', with the matches, is in the device E, it is opened up by cams O, similar in construction to the cams N and operating in the same manner, only in the reverse order, so as to open up the frame—that is to say, the levers N⁶ are first engaged by the ridges N⁷ of the cams O to unlock the bar C⁶ and then to move said bar and successively the plates C⁸ apart by the ridges N⁴ to unclamp the matches, which are now slightly touched on top by a brush E', mounted to reciprocate above the link-frame and adapted to engage with its bristles the heads of the matches and push the same downward into a collecting-box P, having a reciprocating motion, as hereinafter more fully described. The brush E' is mounted to slide vertically in suitable guideways E² and is held normally in an uppermost position by springs E³ and is forced downward by cams E⁴, secured on a shaft E⁵, geared with a shaft E⁶, geared to the main driving-shaft G⁴, so that when the latter is rotated a rotary motion is given to the shaft E⁶ and the motion of the latter is transmitted to the shaft E⁵, so that the cams E⁴ at the proper time cause the brush E' to slide downward to push the matches out of the now open link-frame C', the matches dropping into the collecting-box P.

The collecting-box is partitioned, as indicated in Figs. 19, 20, and 21, and is mounted to slide transversely on bearings P' and is connected with the eccentric-rod P² of an eccentric P³ on the shaft E⁶, previously mentioned, so that when the latter is rotated a continuous reciprocating motion is given to the box P. The latter is provided with slidable bottoms P⁴, mounted to slide in guideways P⁵, formed on the guideways P', and said bottoms are pivotally connected by links P⁶ with the upper ends of levers Q, fulcrumed on the framework and carrying at their lower ends pins or friction-rollers Q' in engagement with the cam-grooves Q² in cams Q³, secured to the shaft Q⁴, driven by suitable gearing, so that the bottoms P⁴ are moved into an open position to allow the collected matches to drop into the box F², secured on the traveling belt to carry the filled box F² to the packer for packing the matches in the usual manner.

When the link-frame moves out from under the device E after the matches have been discharged from said frame and the frame is free of the cams O, then the springs C⁹ press on the movable bar C⁶, so as to push the same toward the bar C⁵ and in doing so close up the frame, the plates C⁸ being fitted closely upon one another and between the bars C⁵ C⁶, the frame remaining in this closed position until it reaches the transferring device, when it is opened by the cams N, as above explained, to receive the splints from a corresponding block H. The box P, with its bottoms P⁴, is so arranged as to receive the matches from a number of links above the bottoms P⁴, it being understood that the matches will readily pack on the bottoms, owing to the reciprocating motion thereof, and when the box is filled then the bottoms P⁴ are opened to allow the matches to drop into the box F and be carried to a more or less distant place.

From the foregoing it is evident that the splints are distributed from a number of stations in the device A, so that a large number of splints are assembled and transferred to the endless carrier C and then provided with paraffin and heads, as described, the matches after being dried being discharged from the machine and carried to the packer. It will further be seen that by holding or clamping the splints at the middle instead of the ends the splints and matches formed are at all times held separate from one another, so that there is no danger whatever of forming double matches, thereby insuring at all times a thorough and proper treatment of each splint to form a perfect match.

When closing a link-frame after the splints are delivered to the frame, the plates C⁸ and bars C⁵ C⁶ are positively moved in a closed position by the action of the cams N, and consequently there is no danger of irregular clamping and no danger of the frames becoming unlocked, and all danger of the splints falling out of a frame is completely avoided.

When unloading the finished matches from the carrier, they are not forced out of the frame by strong force, as the frame is positively opened to allow the matches to drop out of the frame by their own weight, it being understood that the brush E' merely serves to insure a positive removal of the matches in case they should stick; but even then the brush exerts but a slight pressure on the matches, which causes them to drop into the box P. It is understood that matches frequently become ignited while being unloaded from the carrier in other devices, as it requires too much force for the unloading of the matches from such devices.

Having thus fully described my invention, I claim as new and desire to secure by Letters Patent—

1. A match-making machine having a plurality of traveling splint-conveying devices, a plurality of assembling-stations adjacent to the path of travel of the said splint-conveying devices, the assembling-stations each serving to partially fill each splint-conveying device, means for discharging the entire contents of a filled splint-conveying device at a single operation, and means for carrying the discharged splints to the dipping device, substantially as shown and described.

2. In a match-making machine, the combination with a carrier arranged to receive and hold the splints suitably for dipping, of an endless traveling conveyer having a plurality of splint-conveying devices, and arranged adjacent to the said carrier, a plurality of stations adjacent to the path of travel of the said splint-conveying devices, and each serving to partially fill each conveying device, and means for discharging at one operation the entire contents of a filled conveying device to the said carrier, substantially as shown and described.

3. A match-making machine having a plurality of stations for assembling and transferring splints, an endless intermittently-traveling conveyer having splint-conveying blocks, the stations being adjacent to the path of travel of the said blocks, each of the latter being partially filled with splints from a station while at rest thereon, the several stations contributing splints to each block to fill the same at one full travel of the block past all the stations, means for discharging the entire contents of a filled block at one operation and means for carrying the discharged splints to the dipping device.

4. A match-making machine having a carrier for receiving and holding the splints suitably for dipping, a conveyer adjacent to said carrier, and having blocks each with rows of splint-receiving apertures, a plurality of stations adjacent to the path of travel of said blocks, and each arranged for assembling the splints and transferring the same to fill some of the apertures in each block as the latter is at rest at a station, the several stations contributing splints to each block to fill all the rows thereof with splints at one full travel of the block past all the stations, and a transferring device for transferring the splints in a filled block at one operation to said carrier, substantially as shown and described.

5. A match-making machine having a plurality of stations each with a hopper having a grooved bottom, means for ejecting the splints endwise from said bottom, and a conveyer having means for receiving the splints, arranged to travel intermittently from one station to the other, means for discharging the assembled splints from the conveyer and means for carrying the discharged splints to the dipping device, substantially as shown and described.

6. A match-making machine having an endless traveling conveyer with means for receiving the splints, means for imparting an intermittent traveling motion to the said conveyer, a plurality of stations adjacent to the said conveyer, each station having a hopper on each side of the conveyer, and each hopper having a grooved bottom, means for ejecting the splints endwise from the said hoppers into the said conveyer, means for discharging the assembled splints from the conveyer and means for carrying the discharged splints to the dipping device, substantially as shown and described.

7. A match-making machine having a carrier, an endless intermittently-traveling conveyer having perforated blocks for splints, a transferring device for transferring the splints from a block to the said carrier, a plurality of stations along the said conveyer, each station having a hopper on each side of a conveyer or block, for receiving the splints, means for distributing the splints in each hopper, and means for discharging the distributed splints into the block from opposite sides thereof, substantially as shown and described.

8. A match-making machine having an endless fixed guideway, a block-chain traveling intermittently therein and having rows of splint-receiving apertures, a plurality of splint assembling and discharging stations arranged along the path of travel of said block-chain, each station having splint-assembling devices, splint-ejecting devices for ejecting the splints endwise from said assembling devices and into rows of splint-receiving apertures in a block at rest at the time at a station, the several stations contributing rows of splints to each block to fill all the rows thereof with splints at one full travel of a block past all the stations, means for intermittently moving the said chain to bring each block into position at a station for receiving rows of splints therefrom, and a transferring device between the first and the last of said assembling and discharging stations, for transferring the assembled splints from a block to a carrier constructed to receive and hold the splints suitably for dipping, substantially as shown and described.

9. A match-making machine, having an assembling device comprising a plurality of stations, a conveyer moving from one station to the other, to receive a quota of splints from each station, a plurality of hoppers at each station at opposite sides of the conveyer, a splint-distributing means under each hopper, and plungers for ejecting the distributed splints endwise and pushing the same into the said conveyer, substantially as shown and described.

10. A match-making machine having an assembling device comprising a plurality of stations, a plurality of hoppers at each station, a splint-distributing means under each hopper, plungers for discharging the distributed splints, and a perforated block adapted to pass between the hoppers and splint-distributing means at each station to receive the splints from opposite sides, substantially as shown and described.

11. A match-making machine having an assembling device comprising a plurality of stations, a plurality of hoppers at each station, a splint-distributing means under each hopper, plungers for discharging the distributed splints, a perforated block adapted to pass between the hoppers and splint-distributing means at each station to receive the splints from opposite sides, and means, substantially as described, for actuating the said distributing means, plunger and block in unison, to fill a portion of the block at each station, as set forth.

12. A match-making machine having a carrier for receiving and holding the splints suitably for dipping, the carrier comprising frames linked together, each frame having cross-bars, of which one is fixed relative to the other, and the latter is movable toward and from the other, rods secured to the fixed cross-bar, the movable cross-bar being slidable on the rods, transverse clamping-plates movable on the said rods between the cross-bars, and means for engaging the movable cross-bar and the said plates to successively and automatically open and close the frame, substantially as shown and described.

13. A match-making machine having a carrier for receiving and holding the splints suitably for dipping, the carrier comprising frames linked together, each frame having cross-bars, of which one is fixed relative to the other, and the latter is movable toward and from the other, rods secured to the fixed cross-bar, the movable cross-bar being slidable on the rods, transverse clamping-plates movable on the said rods between the cross-bars, said clamping-plates being concave at the inner face and convex at the outer face, and means for engaging the movable cross-bar and the said plates to successively and automatically open and close the frame, substantially as shown and described.

14. A match-making machine having carrier-frames linked together, each frame comprising cross-bars, rods secured on one cross-bar, the other cross-bar being movable on the rods, transverse clamping-plates movable on the rods between the cross-bars, and a cam for engaging the movable cross-bar and the said plates to successively open and close the frame, substantially as shown and described.

15. A match-making machine having carrier-frames linked together, each frame having cross-bars, of which one is fixed and the other is movable toward and from the other fixed cross-bar, rods secured to the fixed cross-bar, the rods of adjacent frames being pivotally connected with each other, transverse clamping-plates movable on the rods between the said cross-bars, and means for engaging the movable cross-bar and the said plates to successively and automatically open and close the frame, substantially as shown and described.

16. A match-making machine, provided with a carrier having a link-frame with movable members to receive the splints and lock the same separated in position, a cam for engaging the members to successively open and close the same, and means for locking the members in a closed splint-clamping position, the means being controlled by the said cam, as set forth.

17. A match-making machine having a splint-carrier, comprising link-frames pivotally connected with each other and each having cross-bars, longitudinal rods carried by one cross-bar, the other cross-bar being slidable on the rods, clamping-plates parallel to the cross-bars and slidable on the rods, and a cam for moving the plates and movable cross-bar successively apart to open the frame, substantially as shown and described.

18. A match-making machine having a splint-carrier, comprising link-frames pivotally connected with each other and each having cross-bars, longitudinal rods carried by one cross-bar, the other cross-bar being slidable on the rods, clamping-plates parallel to the cross-bars and slidable on the rods, and a revoluble cam having a segmental flange and ridges for successively opening the plates and the movable cross-bar, substantially as shown and described.

19. A match-making machine having a splint-carrier, comprising link-frames pivotally connected with each other and each having cross-bars, longitudinal rods carried by one cross-bar, the other cross-bar being slidable on the rods, clamping-plates parallel to the cross-bars and slidable on the rods, and a revoluble cam having a return-ridge for engaging the movable cross-bar to close the frame, substantially as shown and described.

20. A match-making machine having a splint-carrier, comprising link-frames pivotally connected with each other and each having cross-bars, longitudinal rods carried by one cross-bar, the other cross-bar being slidable on the rods, clamping-plates parallel to the cross-bars and slidable on the rods, and a cam for moving the plates and movable cross-bar successively apart to open the frame, and to then move the movable cross-bar in an opposite direction to close the frame, substantially as shown and described.

21. A match-making machine having a splint-carrier, comprising link-frames pivotally connected with each other and each having cross-bars, longitudinal rods carried by one cross-bar, the other cross-bar being slidable on the rods, clamping-plates parallel to the cross-bars and slidable on the rods, a cam for moving the plates and movable cross-bar successively apart to open the frame, and to then move the movable cross-bar in an opposite direction to close the frame, and a lever controlled by the cam and serving to lock the frame in a closed position, substantially as shown and described.

22. A match-making machine, provided with a carrier-frame, comprising cross-bars, rods secured on one cross-bar, the other cross-bar being slidable on the rods, plates between the cross-bars and slidable on said rods, and a lever on the movable cross-bar, and adapted to engage a notch in the rod, to lock the frame in a closed position, substantially as shown and described.

23. A match-making machine having a movable carrier with frames, each frame having cross-bars, of which one cross-bar is fixed and the other is movable toward and from the fixed cross-bar, rods carried by the fixed cross-bar and on which the movable bar is mounted to slide, the rods of adjacent frames being pivotally connected with each other, clamping-plates movable between the cross-bars to allow the plates to open to receive the splints, and to close to clamp the splints, the clamping-faces of the bars being curved to engage and clamp each splint between its ends, means for engaging the movable cross-bar and the said plates to successively and automatically open and close the frame, a grooved fixed bottom-support below a frame, and supporting-rods above the frame to hold the splints in position for the frame while the plates are in an open position and until the frame is closed to clamp the splints between their ends, substantially as shown and described.

24. A match-making machine having a movable carrier with frames, each frame having cross-bars, of which one cross-bar is fixed and the other is movable toward and from the fixed cross-bar, rods carried by the fixed cross-bar and on which the movable bar is mounted to slide, the rods of adjacent frames being pivotally connected with each other, clamping-plates movable between the cross-bars to allow the plates to open to receive the splints, and to close to clamp the splints, the clamping-faces of the bars being curved to engage and clamp each splint between its ends, means for engaging the movable cross-bar and the said plates to successively and automatically open and close the frame, a grooved fixed bottom-support below a frame, supporting-rods above the frame to hold the splints in position for the frame while the plates are in an open position and until the frame is closed to clamp the splints between their ends, and means for closing the frame while in position between the said support and rods, substantially as shown and described.

25. A match-making machine, provided with a movable carrier having match-clamping frames, each frame having movable clamping-plates, a cam for opening the said plates, and a brush over the frame and arranged for engaging the matches unlocked on opening the plates and for pushing the same out of the frame, substantially as shown and described.

26. A match-making machine, provided with a movable carrier having match-clamping frames, each frame having movable clamping-plates, a cam for opening the said plates, a brush over the frame and arranged for engaging the matches unlocked on opening the plates and for pushing the same out of the frame, and a box below the frame for receiving the matches discharged from the frame, substantially as shown and described.

27. A match-making machine, provided with a movable carrier having match-clamping frames, each frame having movable clamping-plates, a cam for opening said plates, a brush over the frame and arranged for engaging the matches unlocked on opening the plates and for pushing the same out of the frame, a box below the frame for receiving the matches discharged from the frame, and means for imparting a vertically-reciprocating motion to the brush and a horizontal reciprocating motion to said box, substantially as shown and described.

28. A match-making machine, provided with a movable carrier having match-clamping frames, each frame having movable clamping-plates, a cam for opening the said plates, a brush over the frame and arranged for engaging the matches unlocked on opening the plates and for pushing the same out of the frame, a box below the frame for receiving the matches discharged from the frame, sliding bottoms for said box, and means for automatically opening and closing said bottom, substantially as shown and described.

MORRIS SAN.

Witnesses:
THEO. G. HOSTER,
EVERARD BOLTON MARSHALL.